(12) United States Patent
LaRowe, Jr. et al.

(10) Patent No.: US 6,314,091 B1
(45) Date of Patent: Nov. 6, 2001

(54) WIRELESS PERSONAL AREA NETWORK WITH AUTOMATIC DETACHMENT

(75) Inventors: Richard P. LaRowe, Jr., Franklin; Thomas Brand, Reading; David Wacker, Bedford, all of MA (US)

(73) Assignee: GTE Service Corporation, Irving, TX (US)

( * ) Notice: Subject to any disclaimer, the term of this patent is extended or adjusted under 35 U.S.C. 154(b) by 0 days.

(21) Appl. No.: 09/109,438

(22) Filed: Jul. 2, 1998

(51) Int. Cl.$^7$ .................................................. H04Q 7/24
(52) U.S. Cl. ...................... 370/338; 370/230; 370/475; 455/556
(58) Field of Search ...................... 370/338, 401, 370/230, 475, 235, 311, 313, 328, 329, 331; 455/556, 557; 709/223, 227, 237

(56) References Cited

U.S. PATENT DOCUMENTS

| | | | |
|---|---|---|---|
| 5,371,734 | | 12/1994 | Fischer .................................. 370/18 |
| 5,604,735 | * | 2/1997 | Levinson et al. ..................... 370/360 |
| 5,699,357 | | 12/1997 | Carvey .................................. 370/347 |
| 5,737,328 | * | 4/1998 | Norman et al. ...................... 370/331 |
| 5,848,064 | * | 12/1998 | Cowan .................................. 370/338 |
| 6,097,733 | * | 8/2000 | Basu et al. ............................ 370/468 |
| 6,128,492 | * | 10/2000 | Chung .................................. 455/435 |

FOREIGN PATENT DOCUMENTS

| | | | |
|---|---|---|---|
| 0505126 A2 | 3/1992 | (WO) | ............................. G06F/11/20 |
| WO 96/14697 | 5/1996 | (WO) | ............................. H04B/15/00 |

OTHER PUBLICATIONS

Navarro, M. Fernandez, Simulation of Heterogeneous Optical Channel for Indoor Wireless Infrared Communications, Proc. of Melecon '96, May 13–16,1996, Bari, Italy, p. 1035–1038.

Boch, Erik, High Bandwidth MM–Wave Indoor Wireless Local Area Networks, Microwave Journal, Jan. 1996, p. 152, 154–8.

Goyal, Ravender et al., MCM Design Methodology for Portable Wireless Communication Systems Design, Proc. of the SPIE, vol. 2794, p. 230–233.

Butterfly Wireless Connectivity for Interactive Multimedia, Butterfly Communications Inc., 2328 Walsh Ave., Suite B, Santa Clara, CA 95051.

Butterfly's Wireless RF Solution, Butterfly Communications Inc., 2328 Walsh Ave., Suite B, Santa Clara, CA 95051.

Bers, Joshua, A Body Model Server for Human Motion Capture and Representation, Presence, vol. 5, No. 4, Fall 1996, p. 381–392.

Carvey, Philip P., Technology for the Wireless Interconnection of Wearable Personal Electronic Accessories, C 7803–3134–6/96, IEEE, 1996, p. 13–22.

Barber, Thomas, Jr. et al., Designing for Wireless LAN Communications, 8755–3996/96, IEEE, Jul. 1996, p. 29–33.

* cited by examiner

Primary Examiner—Ricky Ngo
(74) Attorney, Agent, or Firm—James K. Weixel

(57) ABSTRACT

A personal area network includes a plurality of peripheral devices attached to the network, at least one attaching peripheral device requesting to attach to the network, and a hub device connected to the network and communicating with the plurality of peripheral devices. The hub device receives the attachment request from the attaching peripheral device, provides the attaching peripheral device with attachment approval and a time-out interval, and detaches the attaching peripheral device when the attaching peripheral device fails to communicate with the hub device for a period of time equal to the time-out interval.

27 Claims, 15 Drawing Sheets

730

740

WIRELESS PERSONAL AREA NETWORK WITH AUTOMATIC DETACHMENT

BACKGROUND OF THE INVENTION

A. Field of the Invention

The present invention relates to a data network and, more particularly, to a data network that facilitates bidirectional wireless data communications between a microcomputer unit and a plurality of peripheral units located within the proximity of the microcomputer unit.

B. Description of Related Art

The size and power consumption of digital electronic devices has been progressively reduced so that personal computers have evolved from lap tops and notebooks into hand-held or belt-carriable devices commonly referred to as personal digital assistants (PDAs). One area of carriable devices that has remained troublesome, however, is the coupling of peripheral devices or accessories to the main processing unit of the PDA. With rare exceptions, such coupling has typically been provided by connecting cables. The connecting cables restrict the handling of the PDA in such a manner as to lose many of the advantages inherent in the PDA's small size and light weight.

While some conventional systems have proposed linking a keyboard or a mouse to a main processing unit using infrared or radio frequency (RF) communications, such systems have typically been limited to a single peripheral unit with a dedicated channel of low capacity.

Based on the foregoing, it is desirable to develop a data network of low power consumption that provides highly reliable bidirectional data communication between a host or server microcomputer unit and a plurality of peripheral units while avoiding interference from nearby similar systems.

SUMMARY OF THE INVENTION

Systems and methods consistent with the principles of the present invention address this need by providing a wireless personal area network that operates at low power and permits a host unit to communicate with peripheral units with minimal interference from neighboring systems.

A system consistent with the principles of the present invention includes a plurality of peripheral devices attached to the network, at least one attaching peripheral device requesting to attach to the network, and a hub device connected to the network and communicating with the plurality of peripheral devices. The hub device receives the attachment request from the attaching peripheral device, provides the attaching peripheral device with attachment approval and a time-out interval, and detaches the attaching peripheral device when the attaching peripheral device fails to communicate with the hub device for a period of time equal to the time-out interval.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the principles of the present invention provide a wireless personal area network that permits a host device to communicate with peripheral devices with minimal power and minimal interference from neighboring networks. The network supports dynamic attachment mechanisms by which the peripheral devices request, receive permission, and attach to the network, and detachment mechanisms by which the host and peripheral devices can make peripheral devices detach from the network.

Network Overview

A Personal Area Network (PAN) is a local network that interconnects computers and devices (i.e., peripherals, sensors, actuators) used by an individual within their immediate proximity (0–20 feet). These devices may be carried or worn on the person or simply located nearby. Some devices may be embedded within an infrastructure (e.g., a building or vehicle) so that they can become part of a PAN as needed.

A PAN in an implementation consistent with the present invention has low power consumption (less than 5 mW at a full Hub data rate of 30 kb/s) and small size (less than $\frac{1}{2}$ in$^3$), supports wireless communication without line-of-sight limitations, supports communication among networks of multiple devices (up to 128 devices), tolerates interference from other PAN systems operating within the vicinity, can be easily integrated into a broad range of simple and complex devices, is low in cost, and is capable of being used worldwide.

Figure 1:
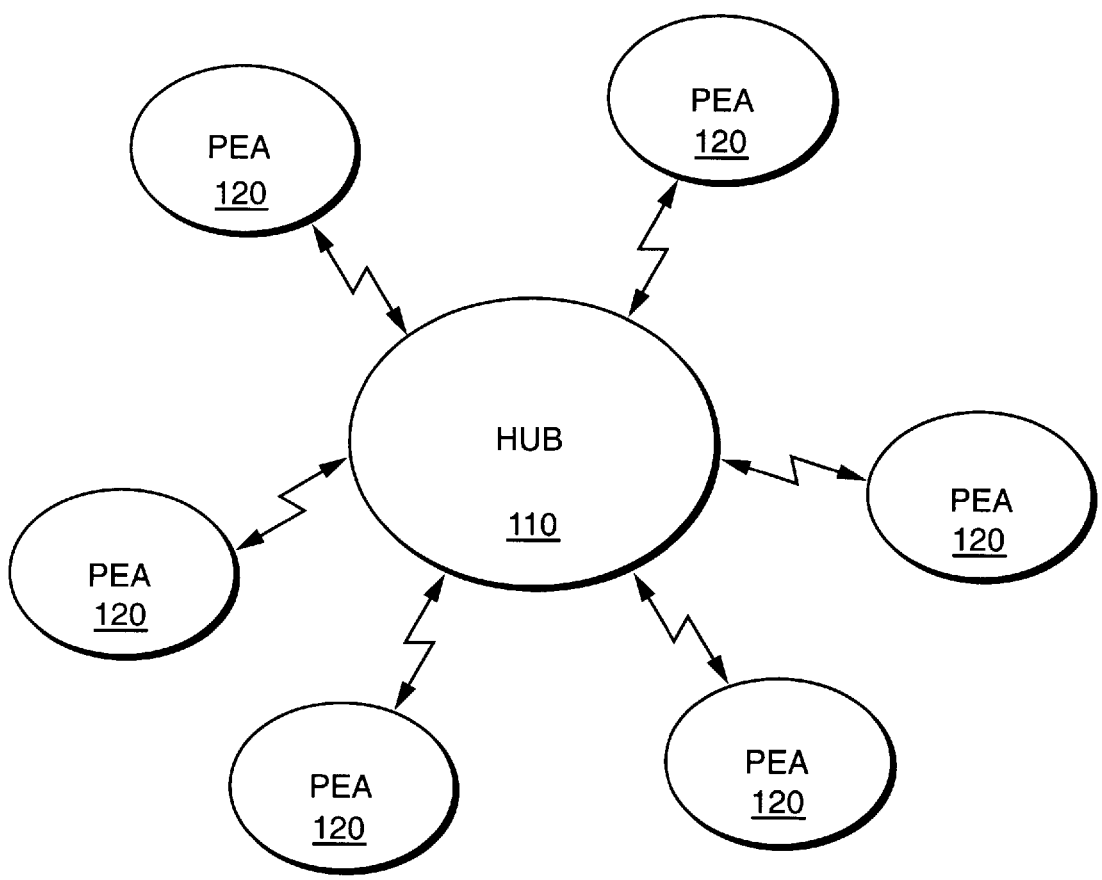
FIG. 1 is a diagram of a personal area network (PAN) consistent with the present invention.

FIG. 1 is a diagram of a PAN 100 consistent with the present invention. The PAN 100 includes a single Hub device 110 surrounded by multiple (as many as 127) Personal Electronic Accessory (PEA) devices 120 configured in a star topology. The Hub 110 orchestrates all communication in the PAN 100, which consists of communication between the Hub 110 and one or more PEA(s) 120. The Hub 110 manages the timing of the network, allocates available bandwidth among the PEAs 120 participating in the PAN 100, and supports the attachment and detachment of PEAs 120 from the PAN 100.

The Hub 110 may be a device that a user carries in a physically central location. Typically, the Hub 110 resides in some sort of wearable computer, or perhaps in a simple pager-like device. The Hub 110 could, however, include other similar or dissimilar devices.

The PEAs 120 may vary dramatically in terms of their complexity. A very simple PEA might include a movement sensor comprising an accelerometer, an 8-bit microcontroller, and a PAN interface. An intermediate PEA might include a bar code scanner and its microcontroller. More complex PEAs might include PDAs, cellular telephones, or even desktop PCs and workstations.

Examplary Hub Device

Figure 2:
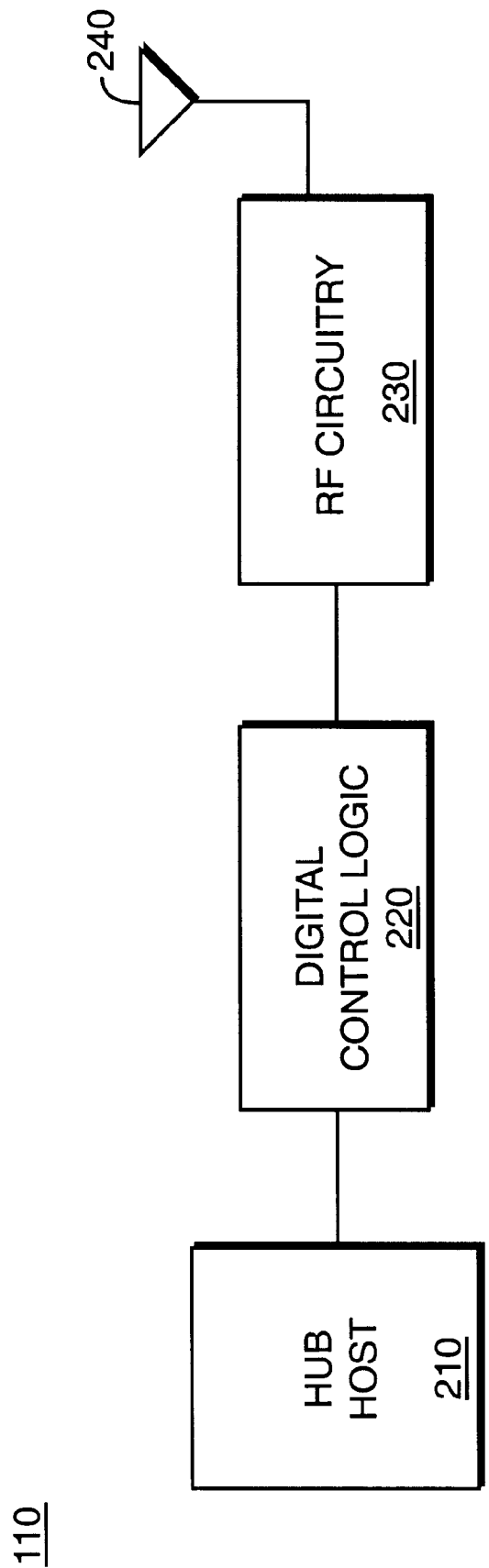
FIG. 2 is a simplified block diagram of the Hub of FIG. 1.

FIG. 2 is a simplified block diagram of the Hub 110. The Hub 110 is a battery powered device that includes Hub host 210, digital control logic 220, radio frequency (RF) circuitry 230, and an antenna 240.

Hub host 210 may include anything from a simple microcontroller to a high performance microprocessor. The digital control logic (DCL) 220 executes software from an internal memory (not shown) to coordinate the operations of the Hub host 210 and the RF circuitry 230. The DCL architecture includes protocols specifically designed to minimize power consumption, cost, and size. These innovations center around a fine-grained, tightly-synchronized, dynamic Time Division Multiple Access (TDMA)-based network access protocol that exploits the short range nature of the PAN 100. The TDMA structure is used to power devices off except for the brief intervals when they are scheduled to transmit or receive. The result is a significant power reduction, depending on network utilization.

The interface between the Hub host 210 and the DCL 220 is based on a small set of commands and responses. The Hub host 210 issues commands to initialize the network, send messages, receive messages, make status inquiries, and perform other assorted management functions. Responses from the DCL 220 are used to feed incoming messages to the Hub host 210 and to provide the Hub host 210 with requested status information.

The RF circuitry 230 includes an RF transceiver to transmit and receive information via the antenna 240. The RF circuitry 230 may alternatively include separate transmitter and receiver devices controlled by the DCL 220. The antenna 240 includes a conventional antenna for transmitting and receiving information over the network.

While FIG. 2 shows the exemplary Hub 110 as comprising three separate elements, these elements may be physically implemented in one or more integrated circuits. For example, the Hub host 210 and the DCL 220 may be implemented as a single integrated circuit, the DCL 220 and the RF circuitry 230 may be implemented as a single integrated circuit, or the Hub host 210, the DCL 220, and the RF circuitry 230 may be implemented as separate integrated circuits.

Exemplary Pea Device

Figure 3:
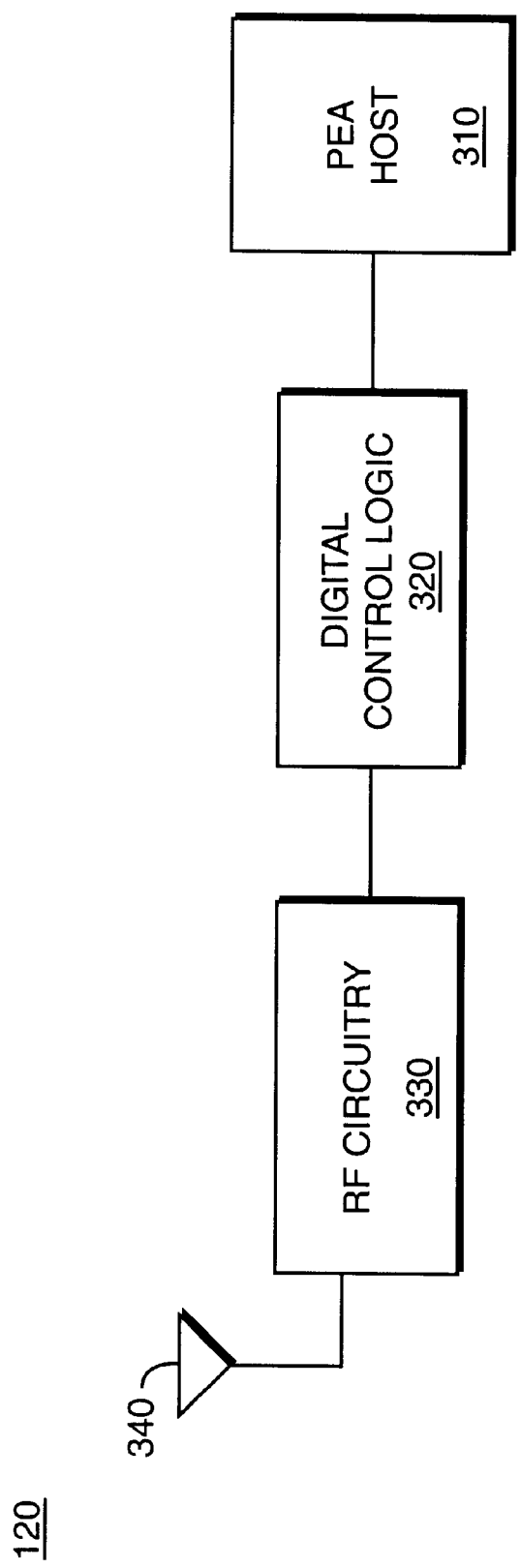
FIG. 3 is a simplified block diagram of a PEA of FIG. 1.

FIG. 3 is a simplified block diagram of the PEA 120. The PEA 120 is a battery powered device that includes a PEA host 310, DCL 320, RF circuitry 330, and an antenna 340.

The PEA host 310 may include a sensor that responds to information from a user, an actuator that provides output to the user, a combination of a sensor and an actuator, or more complex circuitry, as described above. The DCL 320 executes software from an internal memory (not shown) to coordinate the operations of the PEA host 310 and the RF circuitry 330. The DCL 320 sequences the operations necessary in establishing synchronization with the Hub 110, using appropriate code sequences to be used in data communications, in coupling received information from the RF circuitry 330 to the PEA host 310, and in transmitting data from the PEA host 310 back to the Hub 110 through the RF circuitry 330.

The RF circuitry 330 includes an RF transceiver to transmit and receive information via the antenna 340. The RF circuitry 330 may alternatively include separate transmitter and receiver devices controlled by the DCL 320. The antenna 340 includes a conventional antenna for transmitting and receiving information over the network.

While FIG. 3 shows the exemplary PEA 120 as comprising three separate elements, these elements may be physically implemented in one or more integrated circuits. For example, the PEA host 310 and the DCL 320 may be implemented as a single integrated circuit, the DCL 320 and the RF circuitry 330 may be implemented as a single integrated circuit, or the PEA host 310, the DCL 320, and the RF circuitry 330 may be implemented as separate integrated circuits.

Dynamic Attachment Mechanism

The PAN 100 supports dynamic attachment mechanisms by which PEAs 120 join the network simply by coming into range, requesting permission to join, and then establishing communication with application software. This wireless variant of the "Plug and Play" concept is called "Come Close and Play."

Figure 4:
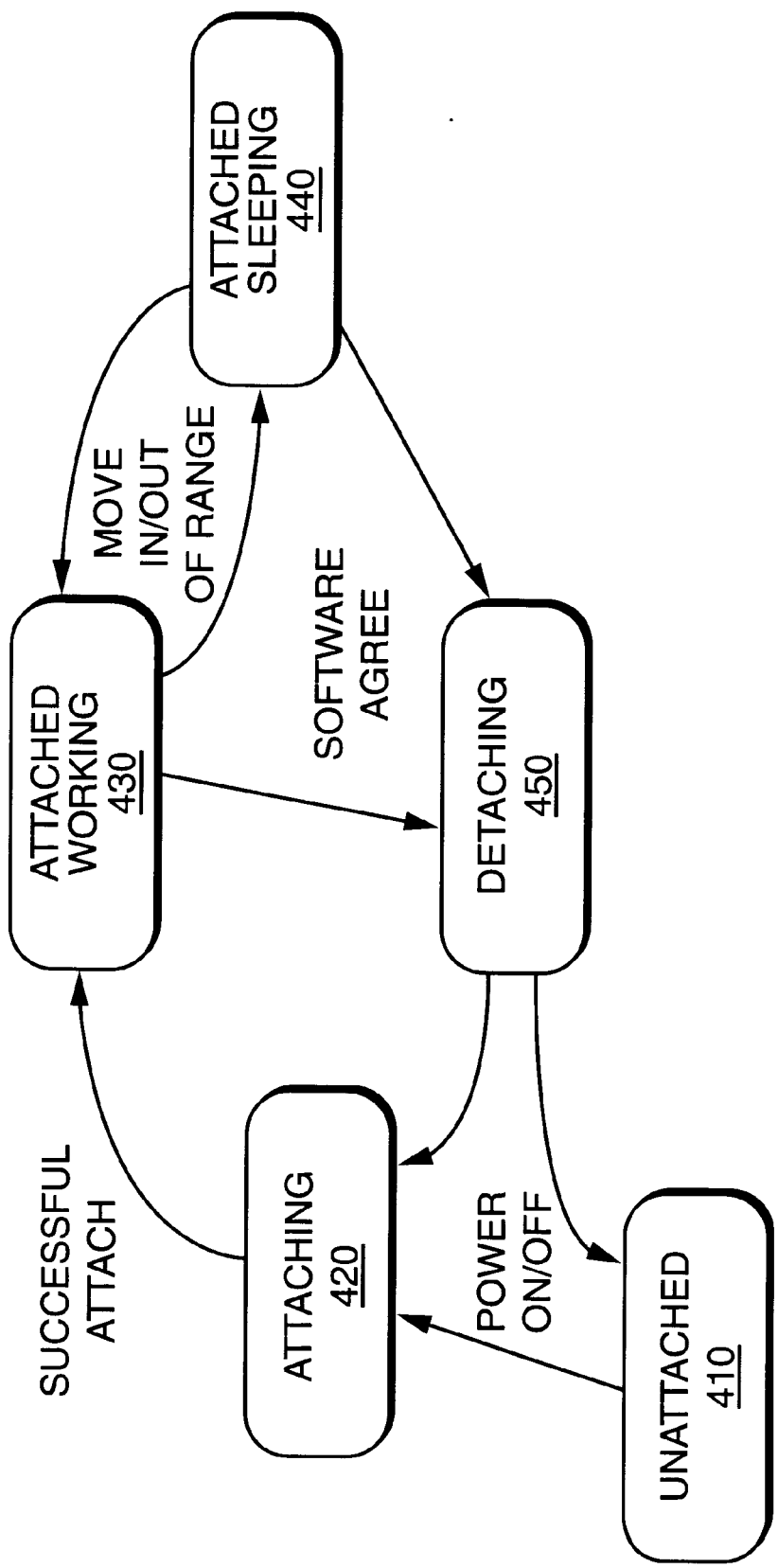
FIG. 4 is a diagram of PEA attachment states in an implementation consistent with the present invention.

FIG. 4 is a diagram of the PEA attachment states in an implementation consistent with the present invention. The Unattached state 410 is a powered-down state in which the PEA is not attached or synchronized to any Hub. The Attaching state 420 occurs when the PEA comes into range and exchanges synchronization data with the Hub in an attempt to establish a communications channel so that data communication can occur. The Attached Working state 430 occurs when the PEA is synchronized to the Hub and data communication can occur. In the Attached Working state 430, the PEA and the Hub exchange data.

The Attached Sleeping state 440 occurs when the PEA is attached to the Hub, but has lost the communication channel because with the PEA or the Hub has moved out of range or has been powered down. In the Attached Sleeping state 440, the PEA sleeps for a prescribed amount of time, wakes up, and then searches for the Hub with the same beacon codes (described below) already prescribed. When in the Detaching state 450, the PEA and the Hub agree to explicitly remove timing information and cease communication. The PEA can then be reassigned to another Hub. At prescribed timing intervals, the Hub looks for PEAs in any of the three "attached" states.

In FIG. 4, labels are used to indicate the primary causes of state transitions. Essentially, it shows that a powered on PEA attempts to attach to a Hub, and once attached, will attempt to remain attached (if in range) until software forces it to transition to the detached state. Once in the detached state, the PEA will once again attempt to attach to a Hub, unless powered off.

Exemplary Network Communication

The PAN 100 supports reliable, ordered delivery of physical data units (PDUs) across the network. The Hub 110 and the PEAs 120 can provide a limited-size data packet and a destination, and the PAN 100 will deliver that packet in a PDU to its destination. The PAN 100 supports four bidirectional communication streams that may carry a maximum of 62 byte data blocks. In burst mode, up to four 62 byte data blocks may be transmitted, but with reduced interference tolerance. Multiple PDUs are delivered in order on a per-stream basis.

Figure 5:
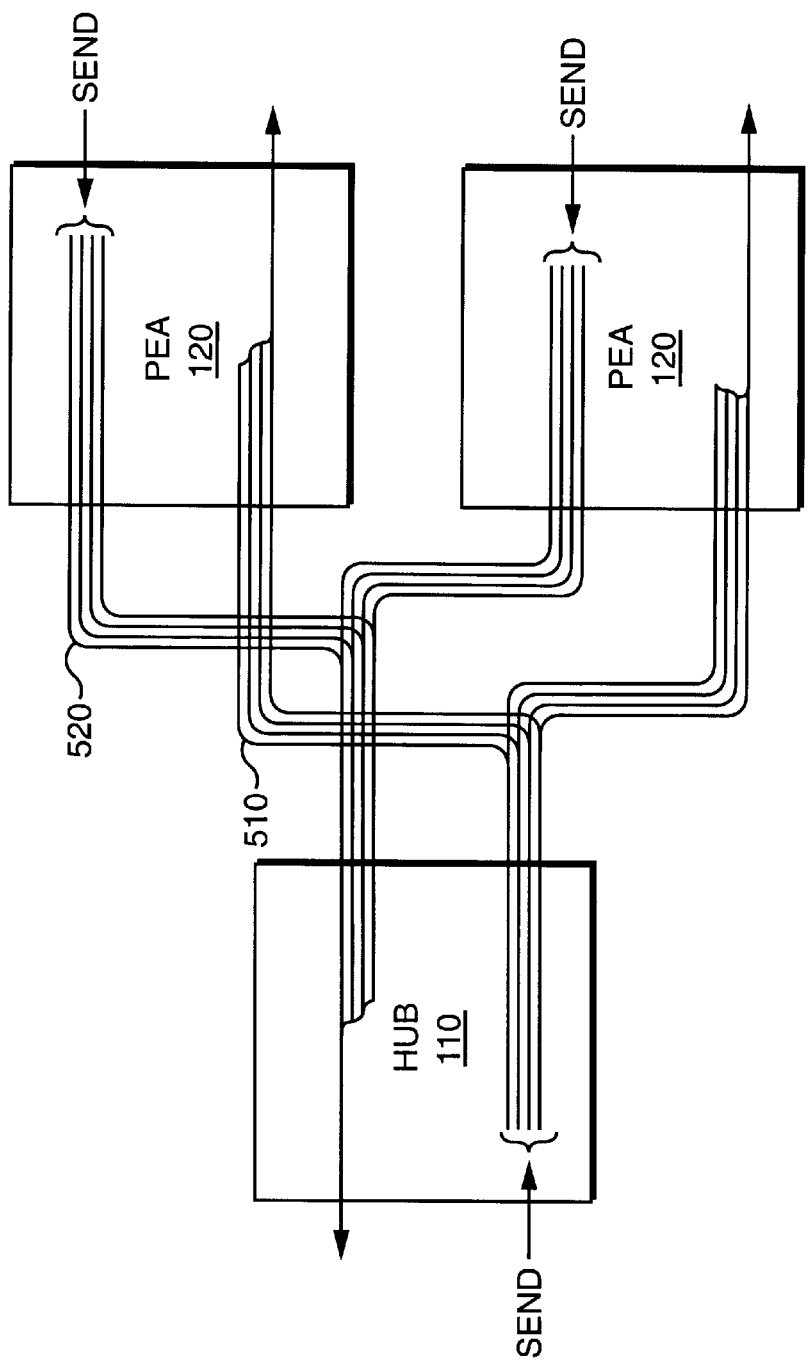
FIG. 5 is a diagram of four communication streams supported by the PAN of FIG. 1.

FIG. 5 is an exemplary diagram of the four communication streams supported by the PAN 100. Due to the star topology of the PAN 100, the Hub 110 has the ability to transmit messages to multiple PEAs 120 on send streams 510. Conversely, PEAs 120 can only send and receive data directly from the Hub 110 via receive and send streams 520 and 510, respectively. The separate send and receive streams 510 and 520 shown in FIG. 5 are only for illustrative purposes. The send and receive streams 510 and 520 are actually combined into four bidirectional communication streams.

The Hub 110 provides services that enable the DCL 220 to control the allocation of network bandwidth. There are two forms of control provided: (1) an implicit Hub-to-PEA mechanism controlling the allocation of outgoing bandwidth from the Hub to the PEA, and (2) an explicit PEA-to-Hub mechanism controlling the allocation of incoming bandwidth from the PEA to the Hub. The implicit Hub-to-PEA mechanism is coupled to a "Send PDU" command that automatically allocates bandwidth for any message that the Hub 110 attempts to transmit to a PEA 120. The explicit PEA-to-Hub mechanism is coupled through a "status request schedule," that is a repeating sequence of PEA and stream identifiers that the Hub 110 identifies as those that should be checked for PDUs available to send. The Hub 110 explicitly defines this schedule to change the allocation of bandwidth from the PEA to the Hub.

By default, the Hub 110 attempts to maintain a 50/50 split between PEA-to-Hub and Hub-to-PEA communications. However, the Hub 110 will not waste bandwidth should there be available cycles in one direction with no demand and communications waiting to be sent in the other direction.

The Hub 110 automatically reschedules communications that are not delivered successfully on the first attempt, and bandwidth is automatically allocated for continued service to devices that indicate that more data is available for transfer.

Exemplary TDMA Timing Structure

In an implementation consistent with the present invention, all of the communication transmissions and protocols are based on TDMA structures. All devices in the PAN 100 know the TDMA structures and, therefore, know when to expect certain types of communication to occur. Not only is the TDMA structuring used as part of the protocol overlay to indicate the type of communication that is occurring, but also is a key component for controlling power in the network. For example, when a device does not need to participate in a particular communication, it powers off its transceiver and all nonessential circuitry.

The PAN 100 employs two levels of TDMA structure. At the highest level, time is divided into logical units that can be considered distinct messages or transactions that are communicated between the Hub 110 and the PEA(s) 120. At a lower level, the individual spacing of radio frequency (RF) energy bursts is defined, which dictates the timing of the underlying DCL and the RF circuitry.

The parameters in Table 1 define an exemplary low level timing structure for PAN 100.

TABLE 1

| Parameter | Comprised Of | Default Value | Meaning |
| --- | --- | --- | --- |
| Symbol Slot | base unit | 2 $\mu$s | One bit is transmitted in a symbol slot. |
| Event Slot | 8 symbol slots | 16 $\mu$s | 8 bits can be transmitted in an event slot. |
| RF burst | 1 event slot | 16 $\mu$s | One RF burst is used to transmit (in an event slot) 8 bits of information. |
| OOC Window | base unit | 13 | Event slots in an OOC window. |
| OOC Windows per Frame | base unit | 73 | Burst triplets per frame. |
| Event Slots per Frame | base unit | 949 | The number of event slots in each TDMA frame. |
| TDMA Frame | Event slots per frame | ~15.2 ms | The TDMA frame is the base unit over which time is managed. |
| Duty Cycle Factor | base unit | 3/13 = .23 | Fraction of event slots used by a single PAN. |

Figure 6:
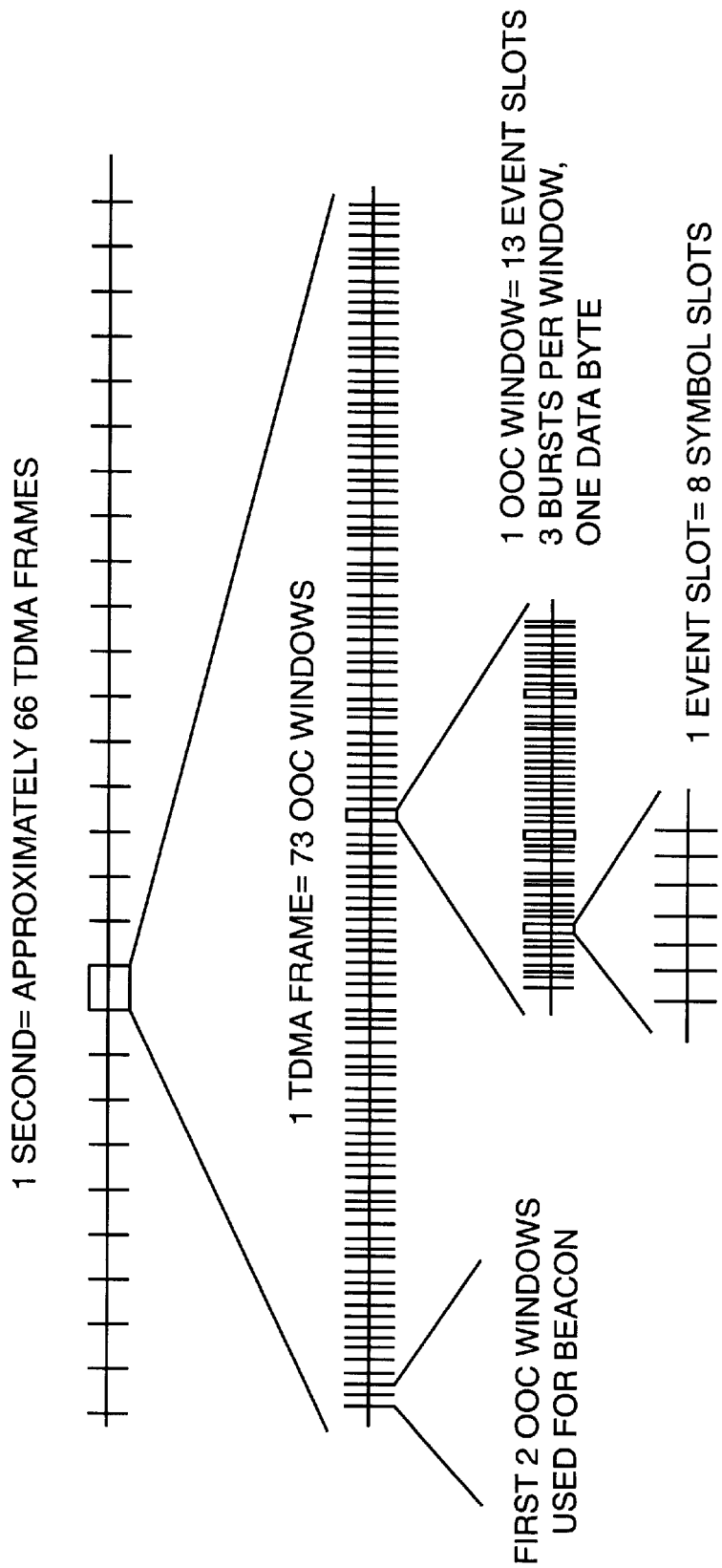
FIG. 6 is a diagram of a low level TDMA frame structure in an implementation consistent with the present invention.

FIG. 6 is a diagram of the low level TDMA frame structure in an implementation consistent with the present invention. Each second of time is divided into approximately 66 TDMA frames. Each frame constitutes a unit over which time is managed, in the sense that there is a TDMA plan that specifies how the time in a frame is to be used.

Each TDMA frame includes 73 OOC Windows, named for the Optical Orthogonal Coding which defines its internal structure. Each OOC Window includes 13 event slots. The event slot is the basic unit of scheduling (and clocking) in a TDMA frame. In the event slots, RF energy bursts are used to transmit data and/or timing information. Assuming an event slot duration of 16 microseconds, the RF bursts arrive at a rate of approximately 62.5 kHz.

Event slots are further partitioned into eight symbol slots. A symbol slot corresponds to the amount of time the RF circuitry will spend transmitting an individual bit ("1" or "0"). Thus, an RF burst comprises an eight bit byte. Assuming a two microsecond symbol slot, the peak symbol rate is 500 kb/s. The orthogonality of the OOC code pattern of bursts allows different PANs to operate within proximity of one another without interfering.

Figure 7:
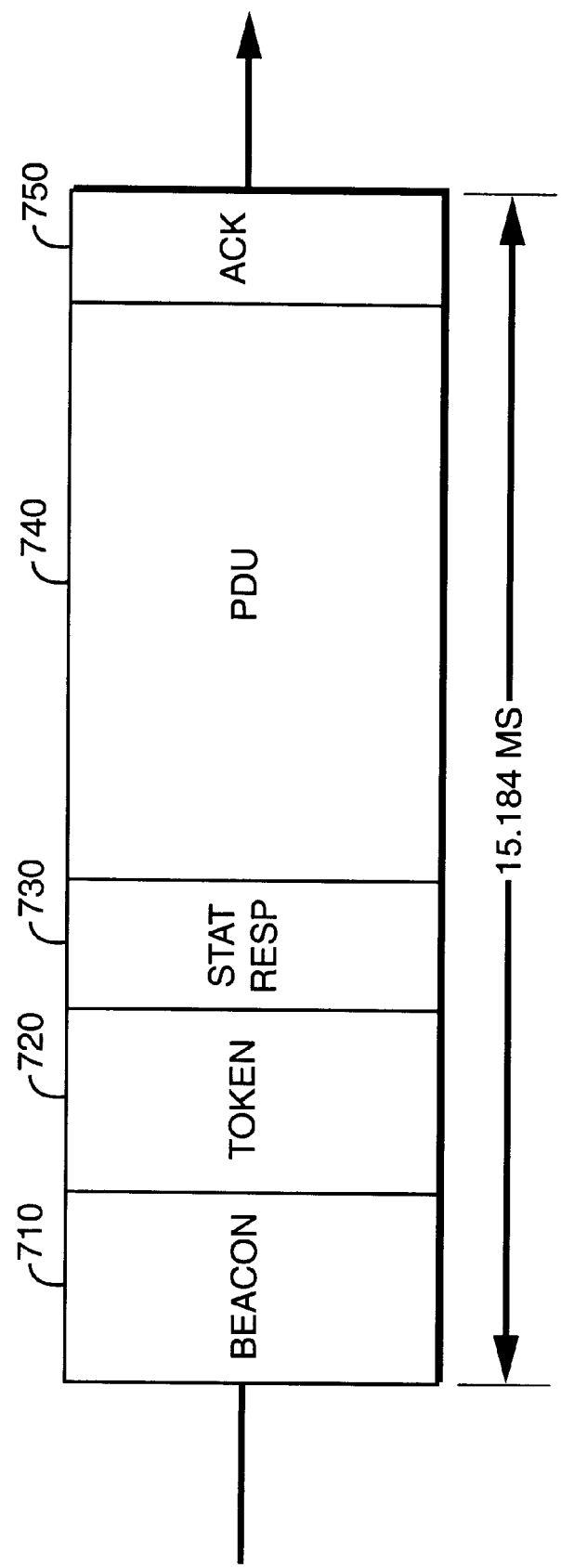
FIG. 7 is a diagram of a high level TDMA frame structure in an implementation consistent with the present invention.

FIG. 7 is a diagram of the high level TDMA frame structure, or TDMA plan, in an implementation consistent with the present invention. At the higher level, time is divided into TDMA frames which include five components: (1) a beacon 710, (2) a token 720, (3) a status response message 730, (4) a physical data unit (PDU) 740, and (5) an acknowledgment 750.

In an implementation consistent with the present invention, the overall frame length is approximately 15.2 ms. Of this, the first 1.2 ms (beacon 710 and token 720 of approximately 0.4 ms and 0.8 ms duration, respectively) is always transmitted by the Hub 110. The PDU data block 740 transmission (13.5 ms) may go in either direction, with the acknowledgment 750 transmission (0.2 ms) in the opposite direction. The status response message 730 is typically a PEA-to-Hub transmission lasting 0.2 ms.

Figure 8:
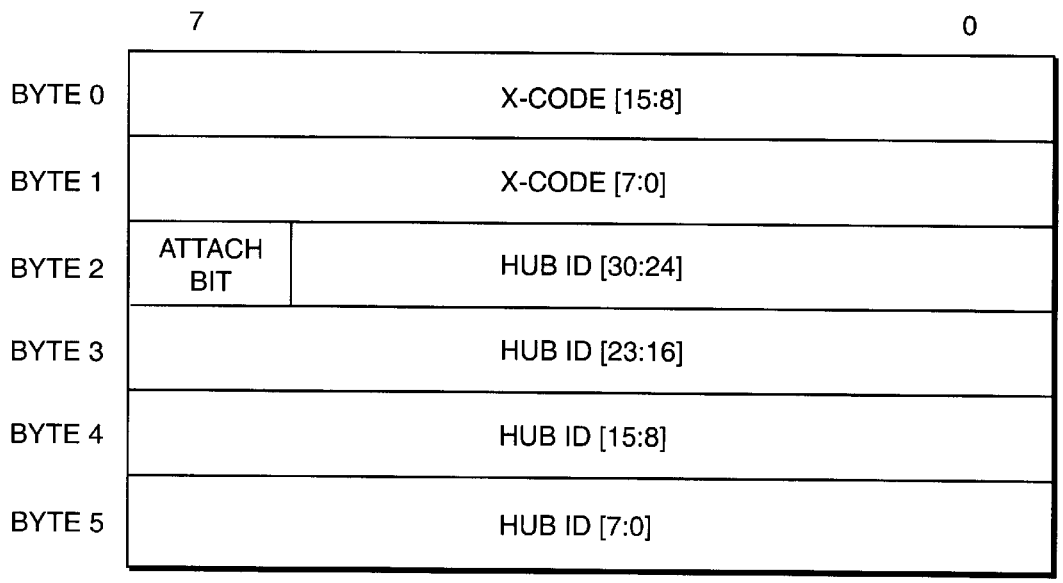
FIG. 8 is a diagram of the structure of a synchronization beacon of FIG. 7.

FIG. 8 is a diagram of the structure of a synchronization beacon 710 in an implementation consistent with the present invention. Synchronization beacons are broadcast transmissions from the Hub to all PEAs. Beacon 710 includes three fields: an X-Code, an Attach Bit, and a Hub Identifier.

The first two bytes of the beacon 710 contain an X-Code= 0010111000001101b, specifically selected as a combination of two Barker Code words. The Attach Bit field stores a single bit flag that indicates whether the Hub is allowing PEAs to attach to its network. If the bit is not set, a PEA attempting to attach to a new Hub will not establish synchronization with this beacon. The remainder of the beacon 710 includes a 31 bit identifier for the Hub, a number that is randomly generated upon initialization. The PEAs use the Hub identifier to verify that they are continuing to synchronize with the correct Hub, since all Hubs transmit the same 16 bit X-Code.

The six byte synchronization beacon 710 is contained in two OOC Windows, including 26 event slots given the exemplary parameters of Table 1. A designated OOC code is used for all synchronization beacon transmissions. This code is one with two back-to-back bursts so that the X-Code can be communicated as one 16 bit transmission.

Figure 9:
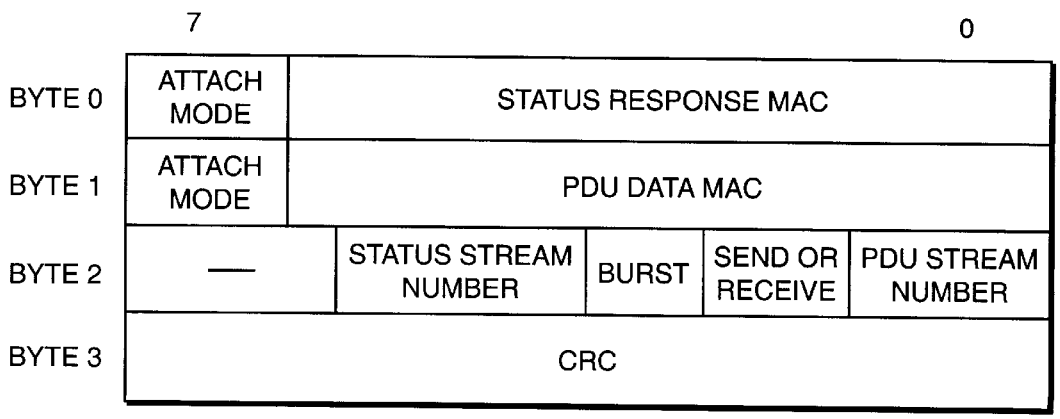
FIG. 9 is a diagram of the structure of a token of FIG. 7.

FIG. 9 is a diagram of the structure of a token 720 in an implementation consistent with the present invention. Tokens are broadcast transmissions from the Hub to all PEAs. The token 720 is four bytes long and includes nine fields: a Status Response Attach Mode, a Status Response Media Access (MAC) Address, a PDU Attach Mode, a PDU MAC Address, a Status Stream Number, a PDU Burst Flag, a PDU Send/Receive Flag, a PDU Stream Number, and a Cyclic Redundancy Code (CRC).

The Status Response Attach Mode field includes a single bit that indicates whether the next status response transmission is targeted at devices already active in the network or devices in attach mode, attempting to access the network. The Status Response MAC Address field includes seven bits that identify a device by its assigned MAC address. The identified device is the target device to respond in the next status response slot.

The PDU Attach Mode field includes a single bit that indicates whether the next PDU data transmission is targeted at devices already active in the network or devices in attach mode, attempting to access the network. The PDU MAC Address field includes seven bits that identify a device by its assigned MAC address. The identified device is the target device to use the next PDU data block.

The Status Stream Number field includes a two bit number that identifies a target stream, from the four available communication streams, for the next status response message. The PDU Burst Flag field includes a single bit that indicates whether burst mode should be used for the transmission described by the PDU portion of the token. The PDU Send/Receive Flag field stores a single bit that indicates whether the token enables a transmission or a reception of a PDU.

The PDU Stream Number field includes a two bit number that identifies the target stream for the next PDU data block transmission. The CRC field, which is used for error detection, includes an 8 bit CRC ($x^8+x^2+x+1$) on the entire token contents.

This token structure controls precisely one PDU transmission and one status response transmission. In an implementation consistent with the present invention, token transmissions employ 3-way interleaved bit spreading for improved reliability.

Figure 10:
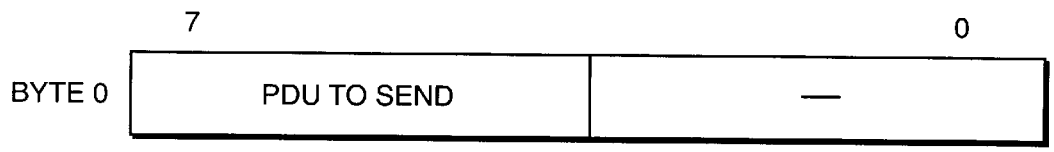
FIG. 10 is a diagram of the structure of a status response message of FIG. 7.

FIG. 10 is a diagram of the structure of a status response message 730 in an implementation consistent with the present invention. Status response messages are always sent from a PEA to the Hub. The status response message 730 is a single byte transmission that encodes a single logical bit of information, and includes a single field of "PDU to Send."

The PDU to Send field includes four bits that encode a single logical bit indicating whether the PEA has a PDU ready to send on the stream designated in the token. To ensure reliable transfer of the status response message, two values are used to redundantly encode the two possible sequence numbers ("0" and "1"):

0:0011
1:1100

Upon reception, the Hub 110 compares the received byte to each of these two code bytes. If no exact match is detected, the status response message is simply ignored.

Figure 11:
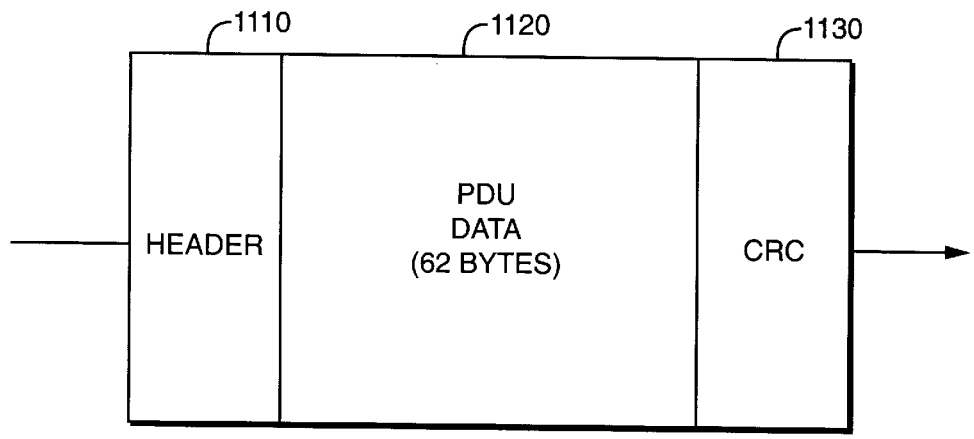
FIG. 11 is a diagram of the structure of a PDU of FIG. 7.

FIG. 11 is a diagram of the structure of a PDU in an implementation consistent with the present invention. PDU transmissions originate from either the Hub or the PEA. There are three logical components of the PDU: a header 1110, PDU data 1120, and CRC 1130.

Figure 12:
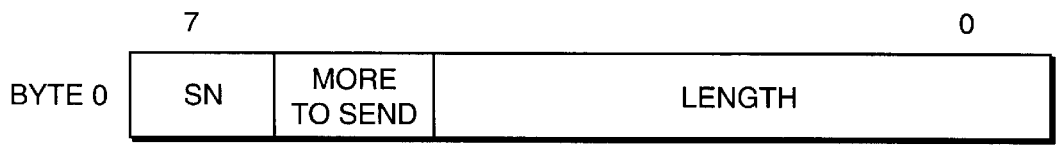
FIG. 12 is a diagram of the PDU header of FIG. 11.

FIG. 12 is a diagram of the PDU header 1110. The header 1110 includes three fields: Sequence Number, More to Send, and Length. The Sequence Number field stores a one bit sequence number of the current PDU. The More to Send field includes a single bit flag that indicates whether the sender has an additional PDU to send to the receiver after the current one. The More to Send flag is used only in PEA-to-Hub transmissions to support bandwidth allocation at the Hub. The Length field includes six bits that indicate the number of bytes, from 0 to 62, included in the PDU data block. The Length field is used to optimize the transmission of data blocks less than the maximum size of 62 bytes.

The PDU data 1120 includes up to 62 bytes of data. The data may comprise control messages or data messages transmitted in either direction between the Hub and the PEAs.

The CRC 1130 includes a 16 bit CRC applied to all elements of the PDU transmission, including the one byte header 1110. The CRC 1130 is the standard CRC-CCITT polynomial:

$$x^{16}+x^{12}+x^5+1$$

At the start of a transmission, the polynomial register is initialized to all 1's. The polynomial register logically advances a bit at a time, following the byte order of the PDU and using the least significant bit of the byte. After all of the bytes have been transmitted, the 1's complement of the polynomial register is transmitted. In order for the residue calculation to be handled properly, bit 15 of the polynomial register is the least significant bit of the next byte transmitted.

For reception, the polynomial register is again initialized to all 1's. The residue is computed over the entire PDU, including the CRC bytes. If no errors are detected, the contents of the polynomial register will be F0B8 (bit-reversed).

Figure 13:
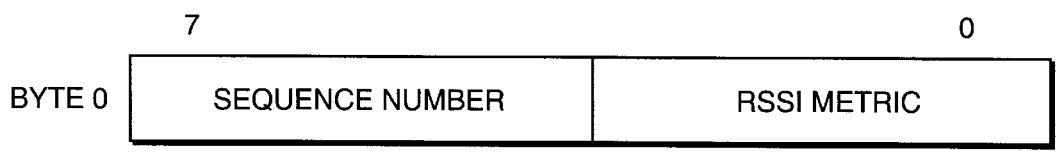
FIG. 13 is a diagram of the structure of an acknowledgment message of FIG. 7.

FIG. 13 is a diagram of the structure of an acknowledgment message 750 in an implementation consistent with the present invention. Acknowledgment messages are transferred both from PEA-to-Hub and from Hub-to-PEA, always in the reverse direction to the immediately preceding PDU transfer. The acknowledgment message 750 is a single byte transmission that encodes a single bit of information: the sequence number of the last PDU correctly received on the designated stream. Also bundled with the acknowledgment is a 4 bit Received Signal Strength Indication (RSSI) value used by the device that originated the PDU to attempt to lower the transmit power when communicating with this device.

To ensure reliable transfer of the acknowledgment message, the Sequence Number field includes two values used to redundantly encode the two possible sequence numbers ("0" and "1"):

0:0011
1:1100

Upon reception, the Hub 110 or the PEA 120 compares the received byte to each of these two code bytes. If no exact match is detected, the acknowledgment is simply ignored.

Four possible values are transmitted in the RSSI field, corresponding to the four available bit positions. These four values are used to adjust the transmit power in the reverse direction to one of four levels from "too little power" to "more than enough power" (described in more detail below).

Exemplary Digital Control Logic

Figure 14:
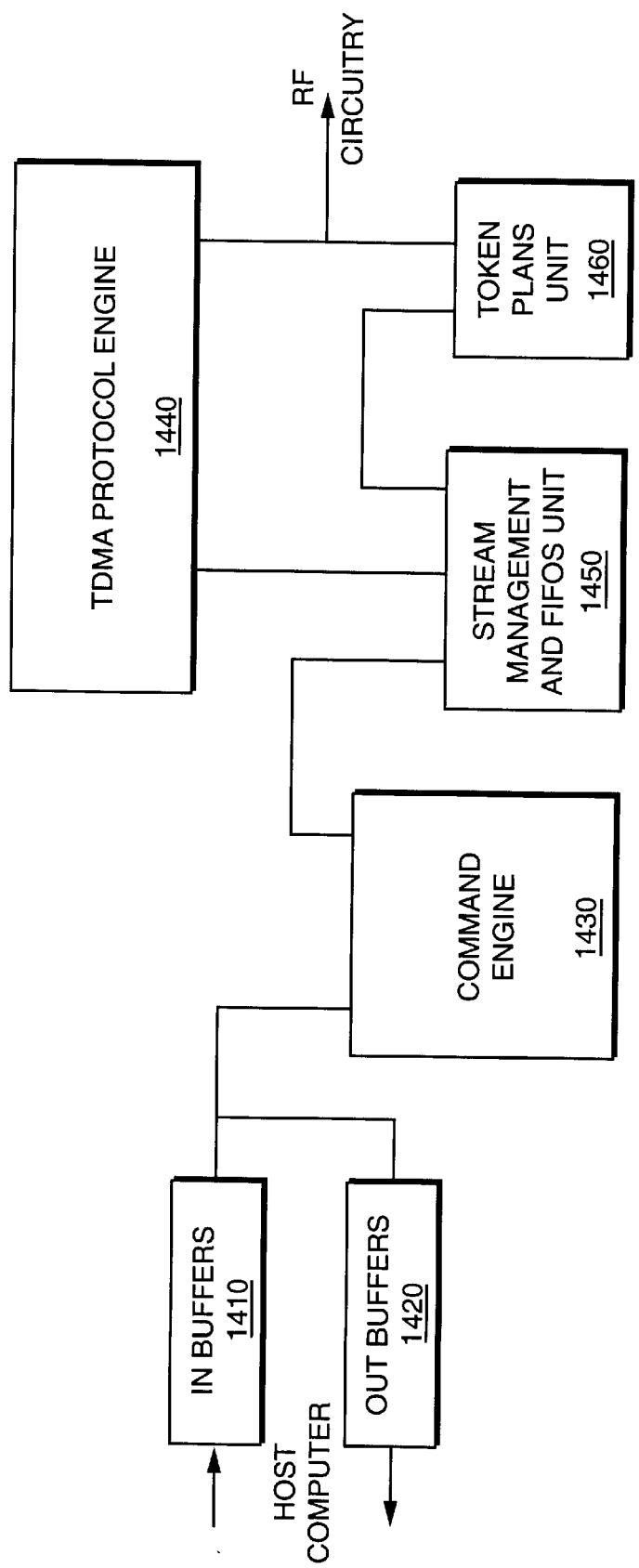
FIG. 14 is a detailed diagram of the digital control logic of FIG. 2.

In order to facilitate the communication described above, the DCL operates upon a number of internal data structures. FIG. 14 is a detailed diagram of the DCL 220 of the Hub 110. The DCL 320 of the PEAs 120 have a similar structure.

The DCL 220 includes input buffers 1410, output buffers 1420, command engine 1430, TDMA protocol engine 1440, stream management and FIFOs unit 1450, and token plans unit 1460. The input and output buffers 1410 and 1420 are each 64 bytes long and provide an interface to the Hub host 210. The buffers temporarily store data, commands, and responses exchanged between the DCL 220 and the Hub host 210.

The command engine 1430 is the primary interface between the Hub host 210 and the DCL 220. A byte-wide data path facilitates the exchange of commands, status, and response messages. The command engine 1430 generally reads and responds to references initiated by the Hub host 210, and detects and responds to events triggered by the TDMA protocol engine 1440.

The TDMA protocol engine 1440 maintains the TDMA plan. The TDMA protocol engine 1440 defines all of the communication transmissions and protocols used in the TDMA plan. The TDMA plan defined by the TDMA protocol engine 1440 is known by all devices connected to the network.

The stream management and FIFOs unit 1450 buffers PDUs transmitted over the communication streams of the PAN 100. The unit 1450 facilitates message sequencing, retransmit support for assuring ordered delivery, and simply managing (in a flow control sense) the difference in operational speeds between the Hub host 210, the DCL 220, and the RF bandwidth allocated by the Hub 110.

Figure 15:
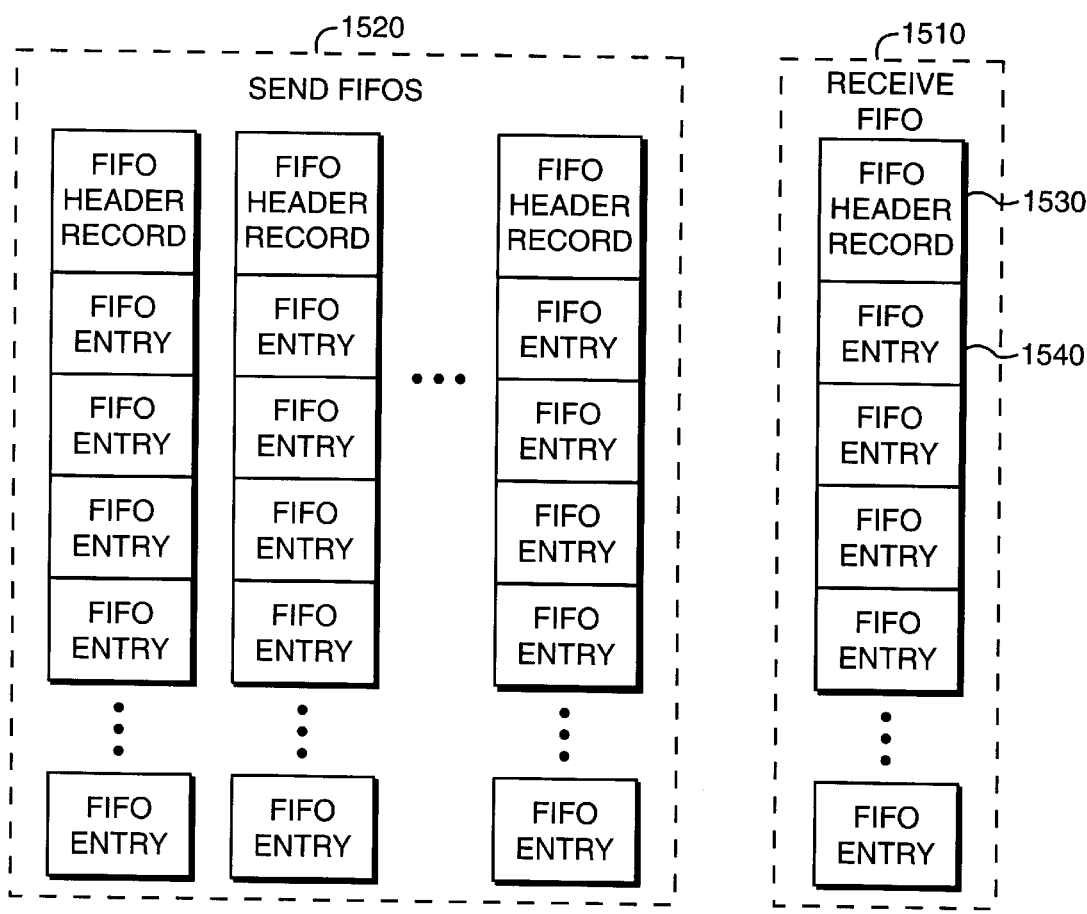
FIG. 15 is a diagram of FIFOs within the stream management and FIFOs unit of FIG. 14.

FIG. 15 is a diagram of the FIFOs within the stream management and FIFOs unit 1450. The stream management and FIFOs unit 1450 contains distinct receive and send FIFOs 1510 and 1520. A single receive FIFO 1510 is used for all communications (i.e., all MAC/stream combinations) arriving at a device (Hub or PEA), whereas a different send FIFO 1520 is used to buffer communications targeted for each unique destination (i.e., MAC/stream combination). Nevertheless, the overall structure of the send and receive FIFOs is similar.

Each FIFO includes a FIFO header 1530 and a set of FIFO entries 1540. The FIFO headers 1530 differ slightly between the receive and send FIFOs 1510 and 1520. Both FIFO headers 1530 include pointers to the next available and the oldest entries in the corresponding FIFOs 1510 and 1520. In addition, the FIFO header 1530 for the send FIFOs 1520 includes a field for combining multiple FIFOs into a single longer FIFO for use by a single stream.

The FIFO entry 1540 is identical for both the receive and send FIFOs 1510 and 1520. The FIFO entry 1540 is designed to hold a 62 byte PDU data block and a simple header. The header includes a length field that indicates the length (in bytes) of the PDU data included in the FIFO entry.

Returning to FIG. 14, the token plans unit 1460 orchestrates and manages the allocation of network bandwidth among the devices in the network. The token plans unit 1460 is only incorporated in the DCL 220 of the Hub 110 and ensures that the PEAs 120 are serviced at the desired rate. The DCL 320 of the PEAs 120 do not contain any similar structure.

Figure 16:
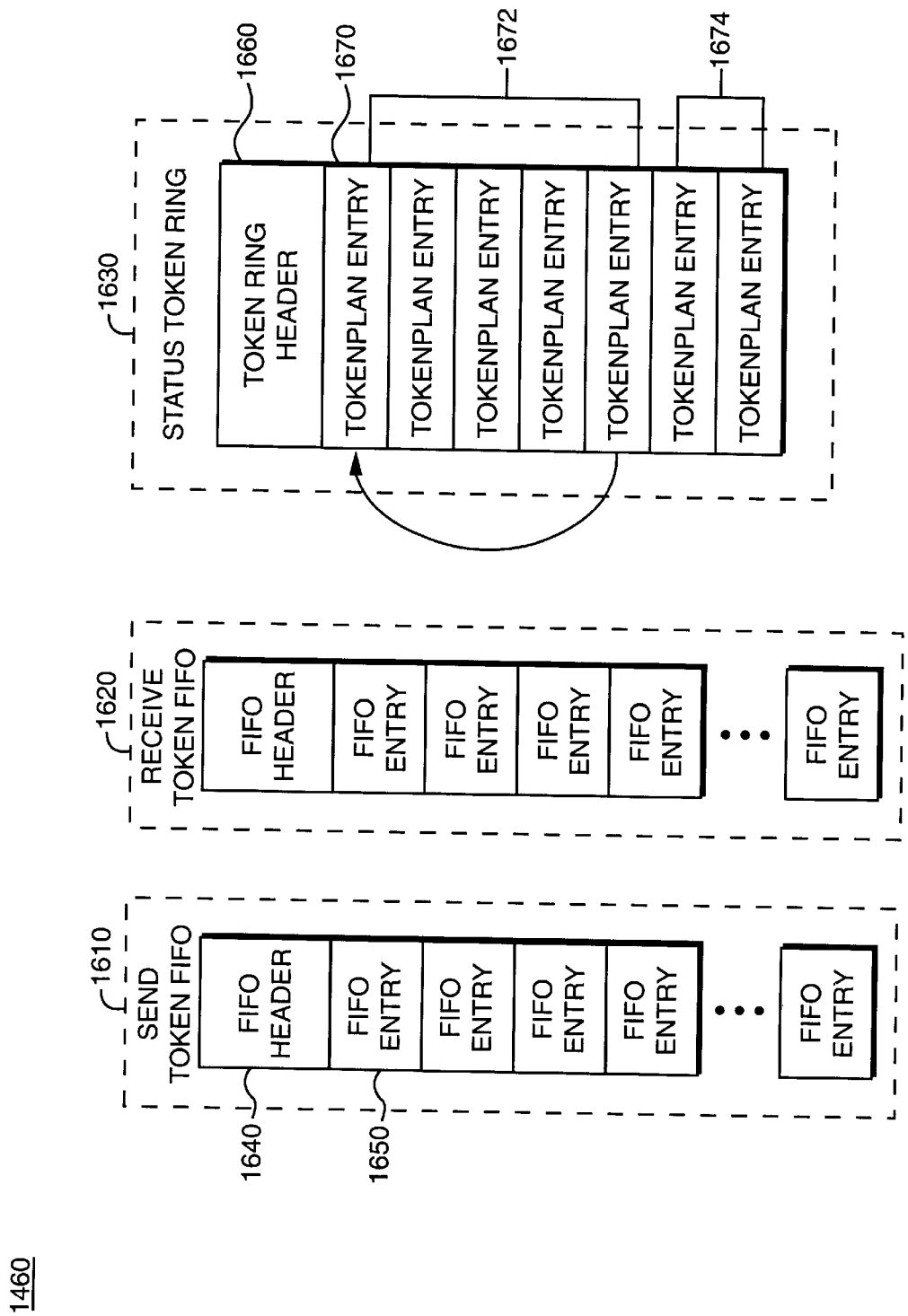
FIG. 16 is a diagram of the token plans unit of FIG. 14.

FIG. 16 is a diagram of the token plans unit 1460. The token plans unit 1460 includes two token plan FIFOs 1610 and 1620 and a status token ring 1630. The token plans unit 1460 uses the two token FIFOs 1610 and 1620 to manage the PDU data block transmissions. The TDMA Protocol Execution Engine 1440 switches back and forth between these two token FIFOs 1610 and 1620 to produce a 50/50 mix of input/output bandwidth, unless one of the FIFOs is empty.

The token FIFOs 1610 and 1620 include a FIFO header 1640 and several FIFO entries 1650. The FIFO headers 1640 are identical for both the send and receive token FIFOs 1610 and 1620. The FIFO header 1640 includes pointers to the next available and the oldest entries in the corresponding FIFOs 1610 and 1620.

The FIFO entries 1650 store tokens. The number of entries in the send token FIFO 1610 matches the total number of send FIFO 1520 entries so that a token can be allocated for each PDU the Hub host attempts to send. The minimum length of the receive token FIFO 1620 is defined by the number of PEAs to which a Hub wishes to actively communicate. So, for example, an implementation designed for use with an eight PEA network contains a receive token FIFO 1620 with at least nine entries. The extra entry is used for attachment purposes.

The status token ring 1630 is used for allocating status response message slots. The status token ring 1630 forms a circular ring structure, and includes a token ring header 1660 and some fixed number of token plan entries 1670. The token plan entries 1670 include active and inactive entries 1672 and 1674, respectively. It is the active entries 1672 that form the circular ring structure. The inactive entries 1674 permit the status token ring 1630 to vary in size. The Hub host 210 (FIG. 2) through the command engine 1430 (FIG. 14) defines the set of active entries 1672.

The token ring header 1660 stores an index into the status token ring 1630 to identify the current entry. The current entry contains the next status token to be issued. The token plan entry 1670 stores status tokens and is similar in structure to the FIFO entries 1650 of the send and receive token FIFOs 1610 and 1620.

Exemplary TDMA Processing

The TDMA timing structures drive the bulk of the PAN operations. At any given event slot in a TDMA frame (FIGS. 6 and 7), particular processing is performed by the Hub and the PEAs.

A. Synchronization Beacon Processing

Processing of synchronization beacons depends upon whether the device is operating as a Hub or a PEA. Furthermore, the behavior of a PEA depends upon whether it is attached or unattached, and then can vary after losing synchronization. The four operational modes of beacon processing include: Hub, unattached PEA, attached PEA, and reestablishing synchronization PEA.

In the Hub mode, the Hub transmits synchronization beacons at the appropriate time in the TDMA plan. The Hub transmits the beacon X-Code followed by the Attach Bit and the Hub Identifier. In its basic operational mode, the Hub will continue to transmit synchronization beacons at the start of every frame for as long as it is running.

As a power optimization, the Hub host may elect to take momentary "breathers" during sleep periods. When sleeping, the Hub will stop transmitting beacons (and tokens) for a specified number of frames and then resume normal operation. The Hub will satisfy network latency requirements by not sleeping for too long, and remaining awake long enough to ensure that PEAs are able to resynchronize, attach, and express their desire to communicate.

In the unattached PEA mode, an unattached PEA locates a synchronization beacon transmitted by a Hub. The PEA searches for a beacon based on the X-Code. Because the PEA is not synchronized with the Hub, the PEA listens for a period of time at least as great as a frame. When an X-Code is located, the PEA checks to see if the Attach Bit in the beacon is set. If not, the PEA continues its search for other alternatives. A PEA listens for several frame durations before it will conclude that no beacon is available.

When operating with multiple frequency channels, the PEA scans the alternative channels when the first channel produces no synchronization beacon. The process at each channel is the same (i.e., search for an X-Code and then check if the Attach Bit in the beacon is set). When a synchronization beacon is detected, the PEA synchronizes its frame clock based on the beacon, and saves the Hub Identifier to later distinguish beacons from its Hub from those of other Hubs.

In the attached PEA mode, a PEA attached to a Hub uses the beacons to maintain close synchronization with the Hub. Once synchronized, the PEA listens for the X-Code at the expected location, adjusting the local clock as needed. As long as the PEA continues to find beacons at the expected locations, it does not examine the Hub Identifier, but rather assumes that it is the correct one.

An attached PEA may safely miss a small number of beacons and still remain synchronized. After missing too many beacons, however, the PEA can no longer communicate, and must reestablish synchronization with the Hub.

In the reestablishing synchronization PEA mode, a PEA that has lost synchronization with its Hub (e.g., because it has moved out of range) periodically attempts to reestablish synchronization. The process is similar to the initial process of locating a beacon when unattached. The PEA listens for an X-Code for some period of time, and then checks to see if the Hub Identifier following the code is a match. Alternatively, the PEA might search using a portion of the Hub Identifier.

If after a few frames the PEA cannot locate the Hub beacon, it switches to an alternative frequency channel and tries again. After all frequency channels have been exhausted, the PEA restarts the process with the original frequency.

B. Token Processing

Tokens are Hub-to-PEA control transmissions used to allocate the network bandwidth. An individual token includes three parts (FIG. 9): (1) a status request portion used to control allocation of status request messages ("SR token"); (2) a PDU portion used to control allocation of PDU blocks ("PDU token"); and (3) a CRC portion used to test the integrity of the token.

Token processing requirements vary depending upon whether the device is operating as a Hub or a PEA. Furthermore, the processing varies when the PEA is in the attachment mode. Therefore, the three operational modes of token processing include: Hub, attached PEA, and attaching PEA.

In the Hub mode, the Hub prepares a token that allocates the next status response slot and the next PDU slot at the token slot of each frame. The contents of the FIFO entries 1650 (FIG. 16) and the token plan entries 1670 of the token plans unit 1460 for the PDU and SR tokens combine to form the complete token (FIG. 9), and a CRC byte is added to serve as an integrity check on the token.

The Hub obtains the SR token from the status token ring 1630. The Hub does not modify the contents of the status token ring 1630, but merely navigates through it using tokens as they are encountered. The Hub obtains the PDU token from either the send or the receive token FIFO 1610 and 1620. The Hub alternates between these two FIFOs, remaining on the current FIFO if the other one has no FIFO entries 1650. When the Hub extracts a FIFO entry 1650 from one of the FIFOs, the Hub removes the entry from the FIFO.

When the Hub issues a Send PDU Token, meaning that a PDU will be transmitted from a PEA to the Hub, the Hub saves the MAC address and the Stream Number from the token directly into a receive FIFO entry 1540 in preparation for the expected PDU. This data is not transmitted with the PDU itself, yet the Hub provides for them in the receive FIFO entries 1540 so that the Hub host can distinguish one entry from another.

In the attached PEA mode, a PEA operating in the network listens to each token transmitted by the Hub immediately after the synchronization beacon. The information in the token indicates to the PEA whether it should participate in the next PDU data transmission and/or the next status response transmission.

The PEA first checks the integrity of the token via the CRC. If the CRC does not validate, the PEA ignores the token. If the token is valid, the PEA performs the same checks for both the PDU token and the SR token. First, a comparison against the MAC address is done to determine if there is a match with the local MAC address. If the MAC address does not match, the PEA ignores that portion of the token.

A MAC address match means that the PEA will be involved in the next PDU or status response communication, depending upon in which part of the token the match occurred. The PEA then reads the stream number and direction bit to determine which form of communication is requested. When the token indicates that a PDU will be received from the Hub, the PEA stores the PDU source information into the next free entry in the receive FIFO 1510 in preparation for the arrival of the PDU.

In the attaching PEA mode, a PEA processes tokens differently than when the PEA is already attached. When attaching, the PEA is assigned address MAC 0 and will, therefore, only respond to tokens issued to MAC=0 with the Attach Mode bit set to true.

C. Status Response Processing

PEAs send status response messages when instructed to do so by the Hub via the SR token. The purpose of the status response messages is to provide a short PEA-to-Hub message that reflects whether the PEA has a PDU ready to send on a particular stream. The Hub uses this information to schedule receive tokens that allow PEAs to send PDUs to the Hub. The four operational modes of status response message processing include: attached PEA, attaching PEA, Hub, and Hub for attaching PEAs.

In both the attached and attaching PEA modes, a PEA simply generates a status response message indicating whether the corresponding send FIFO is non-empty. By mapping the MAC address and the stream number from the SR token received from a Hub, the PEA locates the FIFO corresponding to the stream of interest. If there is no assigned send FIFO, then there are no PDUs available. In this case, the PEA generates the status response message from a constant. In either event, the PEA generates a status response message regarding the status of the send FIFO.

In the Hub mode, the Hub first attempts to decode the status response message. If the Hub cannot decode the response, then the Hub simply ignores it. If the Hub successfully decodes the status response message, then regardless of the actual content of the response, the Hub sets a corresponding bit in a detach register (described below), indicating that it has heard a valid message from the specified PEA.

If the status response message indicates that the PEA has a PDU ready to transmit on the stream of interest, then the Hub schedules bandwidth for the PDU by adding a token to the receive token FIFO 1620 (FIG. 16). The Hub generates the FIFO entry 1650 from contents of the token plan entry 1670 in the status token ring 1630 that triggered the status response message.

In the Hub for attaching PEAs mode, the Hub logic for status response message processing is slightly modified when dealing with responses from attaching PEAs. In addition to the normal Hub processing, a response indicating that a PEA has a message to send causes the Hub to set an Aloha Status Response Disable flag to disable further status response messages that support attachment until the Hub has completed processing for the current sequence.

D. PDU Data Transmission Processing

Both Hubs and PEAs send and receive PDU blocks in a manner governed by the PDU portions of tokens allocated by the Hub. The four operational modes of PDU processing include:

PDU transmission, PDU reception, burst communications, and attaching PEA. In the PDU transmission mode, given a destination MAC address and stream number (from the most recent PDU token), the device (Hub or PEA) locates the corresponding send FIFO 1520. The device generates the PDU header 1110 and transmits it on the designated stream. The bytes of the PDU data block immediately follow the header. The device applies the CRC calculation to the header and to the data bytes, and transmits the CRC bytes at the end of the data block.

In the PDU reception mode, reception of a PDU is triggered by the PDU token, either received from the network (if a PEA) or generated locally (if a Hub). The device (Hub or PEA) first identifies a receive FIFO entry 1540 into which the PDU can be written. The device reads the header and assumes that at least the length portion is correct. This is essential because the device needs the length of the PDU data block to know how much data to receive from the network and to write into the receive FIFO entry, and where to find the CRC bytes.

Once the device reads the entire PDU and performs the CRC check on all of the elements, including the header, the device knows with high probability whether the PDU is valid. If the CRC check fails, the device ignores the PDU, leaving the recently allocated entry in the receive FIFO available for the next received PDU.

If the PDU CRC check passes, the device processes the PDU header (FIG. 12). The device first checks the SN field. If this number differs from the one expected for the stream, the device ignores it because even though the PDU is valid, it is a duplicate of an earlier delivery. If the PDU is valid and the sequence numbers match, then the device sets a bit in its detach register corresponding to the source of the message (i.e., the PEA's MAC address if a Hub, or the Hub's identifier if a PEA), indicating that the device has heard a valid directed communication.

Next, if the device is a Hub, the Hub continues its processing by considering whether to generate a new receive token for this MAC/Stream combination. The Hub generates a token if the PDU received is valid, the one expected (i.e., the sequence numbers match), and the More to Send flag in the header is set.

The final step in PDU reception processing is also Hub-specific. In this case, if the CRC test for the PDU failed, the Hub applies tests that check for high error environments (i.e., interference) and trigger recovery mechanisms if appropriate.

In the burst communications mode, burst processing by the device (Hub or PEA) is similar to ordinary communications both in terms of PDU transmission and reception processing. The key difference is that the device communicates four PDUs in the same "space" as that occupied by a single PDU during normal operation. The receiving device uses a single acknowledgment for all four PDUs transmitted to indicate that they either all made it across the communications channel or none of them made it across the channel.

PDU transmission for burst communication is essentially identical to that described above with respect to the PDU transmission mode, except that it is executed four times in succession. The ordinary OOC burst pattern (FIG. 6), assuming that three bursts are transmitted in every 13 event slots, is replaced with a more dense burst mode pattern which sends 12 bursts in every 13 event slots. This means that a 64 byte PDU is transmitted in 16 OOC Windows instead of 64.

Burst transmission may be "packed" according to PDU structure rather than OOC structure. In other words, at the start of the first OOC Window following the token, the device sends the first of the four PDUs in one contiguous burst. After 16 idle event slots, the device transmits the next PDU. Because the length of the individual PDUs may vary, the second through fourth PDU may start at different times. The receiving device determines the start of these PDUs based upon the length of the previous transmissions. There will always be at least 16 events slots, which is slightly more than one OOC Window, prior to the acknowledgment after the last PDU transmission burst.

If there are fewer than four PDUs available for transmission, the device generates empty PDUs to "fill out" the burst transmission. The empty PDUs have a PDU header identical to the first PDU, except the Length field is set to zero, indicating that there are no data bytes included.

All four of the PDUs will use the same sequence number for the transmission, since they are in essence treated as one large PDU. The More to Send flag is only meaningful for the fourth and final PDU, and indicates whether there is a fifth PDU available in the send FIFO. Also, each of the four PDUs will have its own CRC so that each one can be checked for integrity independently. This increases the likelihood that transmission errors will be detected.

PDU reception for burst communication is similar to that described above with respect to the PDU reception mode, except that the device (Hub or PEA) processes four PDU reception activities, with the associated length and CRC checking being done independently for each of the PDUs. The device performs testing of the sequence number only for the first of the four PDUs because the sequence number transmitted in each of the four headers is identical. If the sequence numbers differ, it is due to a transmission error that will be caught by the CRC check. The device processes the More to Send flag only for the last of the four PDUs transmitted because this is the only PDU in which it is guaranteed to be set correctly.

For burst communication, all four CRC checks must "pass" in order for any of the PDUs to be considered valid. If any of the checks fail, then the entire transmission is considered bad. This applies even to zero length "filler" PDUs.

In the attaching PEA mode, PDU transmission (MAC=0, Attach Mode bit=1) includes a few special requirements due to an "Aloha" phase of the PEA attachment activity. The Aloha phase of the software attachment process includes two PDU transfers: (1) a request to join the network sent from a PEA to the Hub, and (2) a response message sent from the Hub to the PEA which includes a real MAC address. Thus, there are four cases to consider: PEA transmission, Hub reception, Hub transmission, and PEA reception.

PEA transmission in the attaching PEA mode is virtually identical to ordinary PDU transmission, except that the sequence number (SN) placed in the header of the PDU (FIG. 12) is unimportant.

At the Hub, PDU reception from an attaching PEA is similar, though not identical, to ordinary PDU reception. The first difference is that the Hub completely ignores the sequence number of the PDU. If the CRC check passes, then the PDU is considered valid. The Hub does not perform sequence number checks or maintenance.

Another difference between ordinary Hub PDU reception and attaching PEA mode Hub PDU reception is that when the CRC check fails, and thus the PDU is not delivered, the Hub reenables SR tokens for attachment to give contending PEAs other (non-contending) opportunities to attach.

The Hub does not regenerate a new receive token in response to the bad reception of a PDU from an attaching PEA. The Hub generates receive tokens for the Aloha phase (MAC=0, Stream=0, Attach Mode=1) only in response to status response messages.

The Hub responds to the arrival of a "request to join the network" PDU from a PEA by sending a message in a PDU of its own. Transmission of this attaching PEA mode PDU is virtually identical to ordinary PDU transmission, except that the sequence number placed in the header of the PDU is unimportant. An additional difference is that the message is always assumed to have been successfully delivered and is thus immediately removed from the send FIFO. The Hub does not wait for an acknowledgment, but simply assumes that the PDU is good and removes it.

Another difference between ordinary Hub PDU transmission and attaching PEA mode Hub PDU transmission is that the Hub reenables SR tokens for attachment to give other PEAs a chance to attach to the network.

Reception of the attaching PEA mode PDU at the PEA has differences similar to those described above for reception at the Hub. The PEA ignores sequence number checks, but performs CRC checks. Typically, the PEA sends no acknowledgment for the PDU, even though no harm is done by sending one as long as it is treated appropriately at the Hub.

An additional difference in the reception of the attaching PEA mode PDU is that the PEA uses the Hub-to-PEA PDU transmission as an acknowledgment of the PEA-to-Hub transmission that proceeded it. If the Hub-to-PEA PDU is valid (i.e., the CRC check passes), then the PEA removes all PDUs in the send FIFO for that stream. There should be just one such PDU, and the PEA removes it by simply resetting the send FIFO.

E. Acknowledgment Processing

Acknowledgments are automatically generated by a receiving device (Hub or PEA) in response to every PDU data transmission. They are always transferred between the Hub and the same PEA as the PDU, but in the opposite direction (i.e., if the PDU went from PEA to Hub then the acknowledgment is from Hub to PEA, and if the PDU went from Hub to PEA then the acknowledgment is from PEA to Hub).

The rules for acknowledgment transmission are based on the well known 0/1 Sliding Window Protocol. This protocol is also known as a single bit sliding window protocol that allows for one outstanding message on a link, and demands that messages on a particular link be delivered in the order they were delivered. The four operational modes of acknowledgment processing include: acknowledgment transmission, basic acknowledgment reception, Hub acknowledgment reception, and attaching PEA acknowledgment reception.

In the acknowledgment transmission mode, a device (Hub or PEA) sends an acknowledgment message upon completion of a PDU reception operation, regardless of whether the PDU reception was successful. The acknowledgment simply indicates to the PDU transmitting device that the sequence number of the last PDU was correctly received. Thus, in order to send an acknowledgment, the device simply extracts the Input Sequence Number (Input SN) for the specified stream and forms an acknowledgment based on its complement.

In the second part of the acknowledgment, the device transmits four bits of RSSI (Received Signal Strength Information). The RSSI is based on a sample gathered during the PDU reception process, and is used for transmit power control.

In the basic acknowledgment reception mode, the device (Hub or PEA) prepares to receive an acknowledgment. The device first decodes and extracts the sequence number. If the device cannot accurately decode the sequence number, it is simply ignores the acknowledgment.

If the device accurately decodes the sequence number, then the device determines whether the PDU receiving device received the PDU it just sent. If the acknowledgment indicates that the PDU was delivered successfully, then the device removes the PDU from the head of the corresponding send FIFO because it was delivered as expected.

In the Hub acknowledgment reception mode, when the Hub cannot decode the acknowledgment or the acknowledgment indicates that the PDU was not successfully transmitted to its destination, a Hub performs two additional tasks: (1) because the PDU will need to be retransmitted, the Hub adds a token to the send token FIFO (FIG. 16) to schedule its transmission; and (2) the Hub applies tests that check for high error environments (i.e., interference) and trigger recovery mechanisms if appropriate. Other than these additional tasks, the Hub acknowledgment reception processing is identical to PEA acknowledgment reception processing, as described above with respect to the basic acknowledgment reception mode.

In the attaching PEA acknowledgment reception mode, acknowledgments are not employed. Thus, after transmitting a PDU to an attaching PEA, the Hub ignores the acknowledgment (if any) that follows the PDU in the TDMA frame.

Attachment and Detachment Processing

Figure 17:
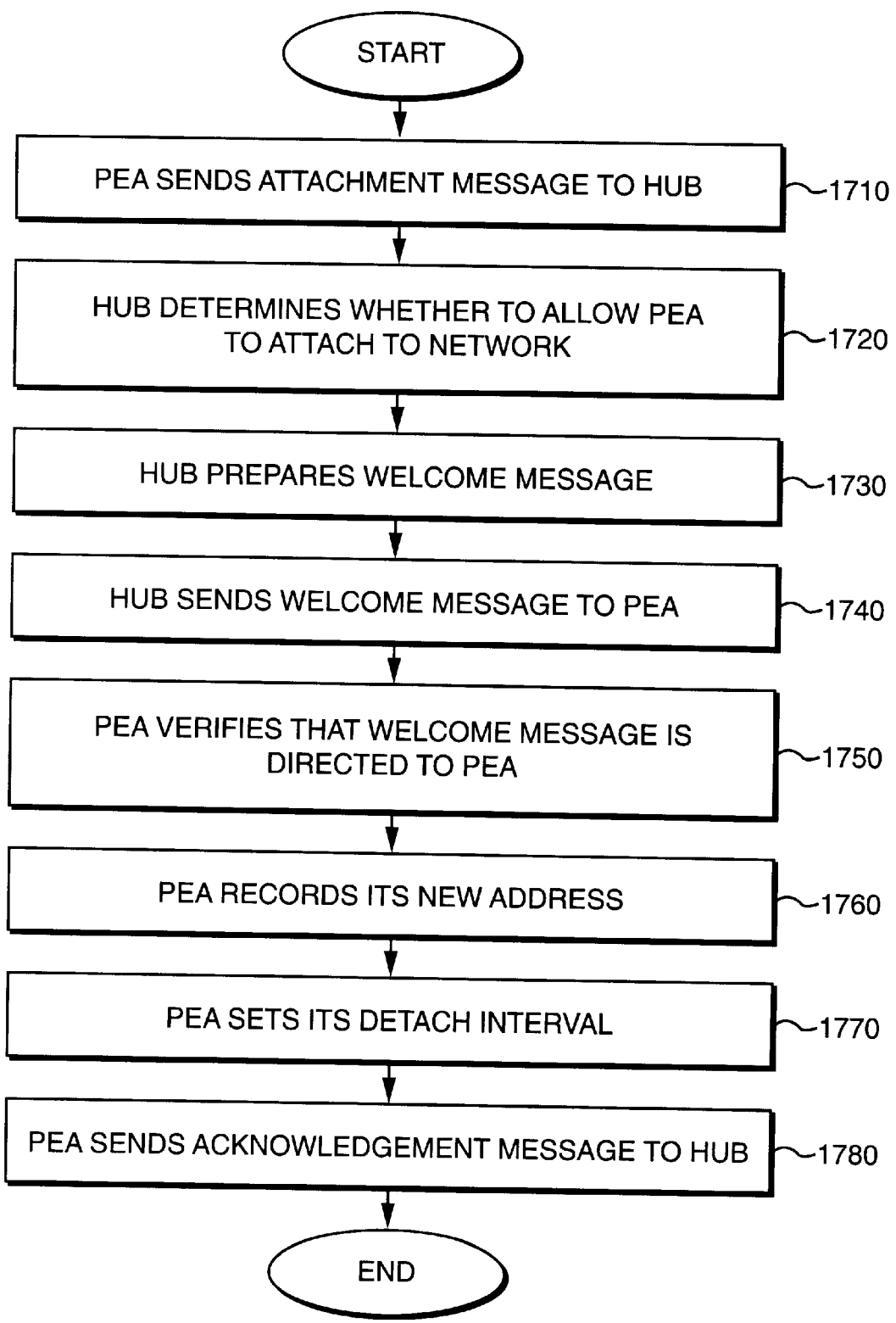
FIG. 17 is a flowchart of attachment processing consistent with the present invention.

FIG. 17 is a diagram of attachment processing consistent with the present invention. When a PEA wants to join a Hub's network, the PEA prepares an attachment message, requesting to join the Hub's network, and sends it to the Hub [step 1710]. The message identifies the PEA by its random 32 bit device ID and a PEA-defined text string, its requirements (e.g., bandwidth needs), and any other relevant information.

Once the PEA transmits the attachment message, the PEA monitors its status to determine: (1) whether it has achieved synchronization with a Hub, and (2) whether it has been accepted into a network by the Hub. The PEA might elect to set a timer with a reasonable delay (e.g., 2000 frames), so that if no response is received from the Hub within some period of time, the PEA can retransmit the attachment message.

Meanwhile, the Hub monitors messages from the network. When the Hub receives a request to join the network from a PEA, the Hub must decide whether to admit the PEA [step 1720]. Assuming it does, the Hub selects a MAC address for the new PEA, and prepares a welcome message informing the PEA of this choice [step 1730]. The Hub transmits the message to the PEA, along with the PEA's device ID [step 1740].

The attaching PEA receives the message and verifies that it was meant for the PEA by checking the device ID included in the message [step 1750]. Assuming a match, the PEA records its new MAC address and removes itself from the attach mode [step 1760]. The PEA might set its Detach Interval (discussed below) at this time, based upon the time value provided to the PEA by the Host in its welcome message [step 1770].

The PEA immediately sends a message to the Hub via its new MAC address [step 1780]. The Hub uses the arrival of this message as an acknowledgment that the PEA has received its MAC address assignment and has joined the network. Failure of this message to arrive within specified time periods is sufficient reason for the Hub host to reassign the MAC to another attaching PEA.

Both the Hub and the PEA use detach logic to automatically detach PEAs from the network. Upon attachment, the Hub and the PEA agree that the PEA may attach to the network in one of two modes: (1) indefinite attachment mode, and (2) connection-based attachment mode. In the indefinite attachment mode, the Hub provides a MAC address to the PEA for an indefinite period of time. Only an exceptional condition (e.g., user or application intervention) will break the attachment.

In the connection-based attachment mode, the Hub agrees to maintain the attachment for a set period of time without receiving communication from the PEA (i.e., a time-out interval), on the order of 15 minutes. The Hub and PEA might negotiate the length of the time-out interval. The Hub provides the actual time (in frames) of the time-out interval to the PEA upon attachment. If the Hub receives no communication from the PEA for the time-out interval, the Hub detaches the PEA and reassigns its MAC address.

Figure 18:
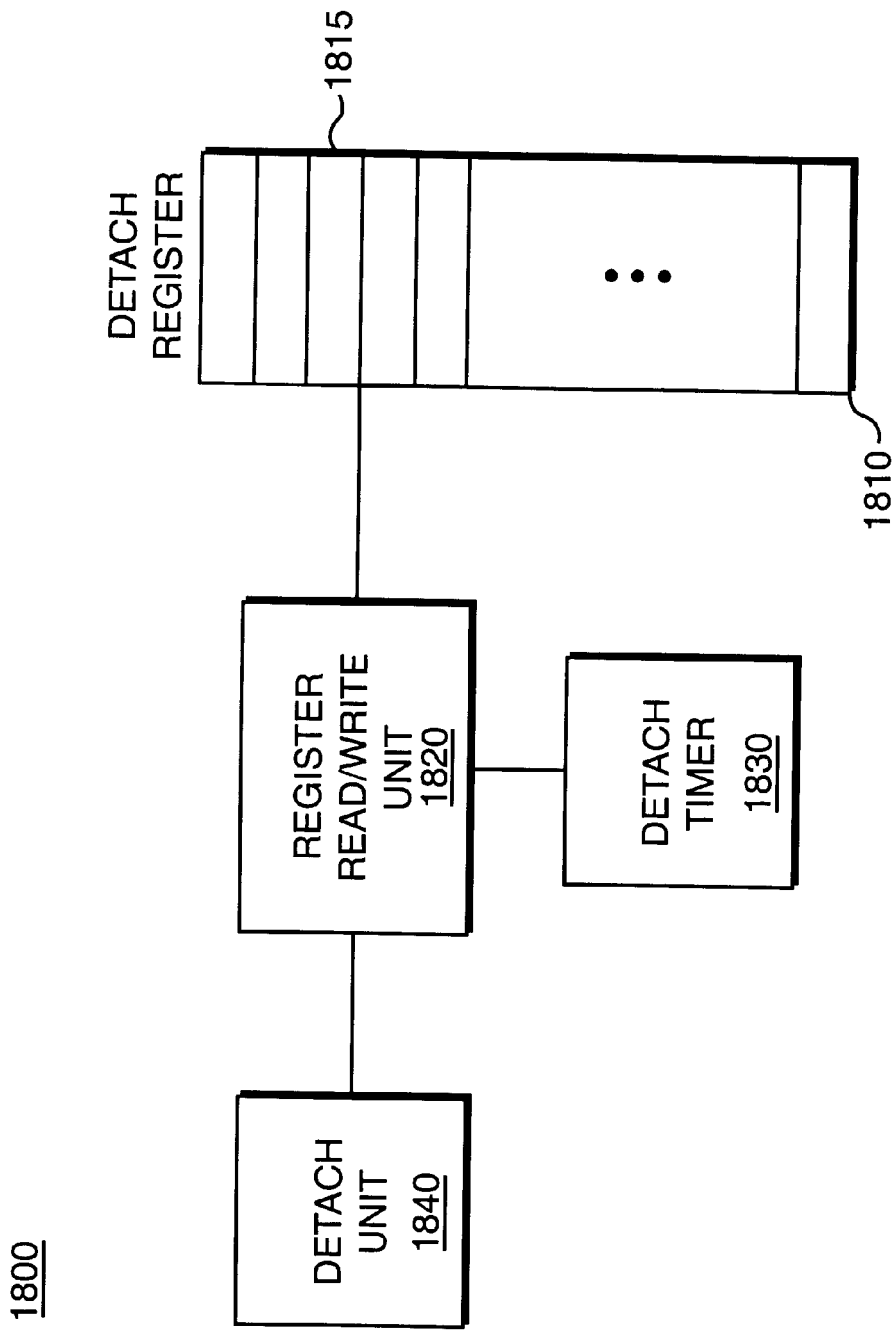
FIG. 18 is a diagram of detach logic in the Hub of FIG. 2.

FIG. 18 is a diagram of the detach logic 1800 contained in the Hub. The detach logic 1800 includes a detach register 1810, a register read/write unit 1820, a detach timer 1830, and a detach unit 1840. The detach register 1810 includes an entry 1815 for each PEA attached in the network. Each entry 1815 stores a single bit that indicates whether communication has been received from the corresponding PEA. The register read/write unit 1820 controls the setting and clearing of the entries 1815 in the detach register 1810. The detach timer 1830 counts a period of time equal to the time-out interval. The detach unit 1840 takes the necessary steps to effectuate the detaching of the PEA.

Periodically, the detach timer 1830 is reset to indicate the start of a time-out interval. The detach timer 1830 informs the register read/write unit 1820 that a time-out interval is about to commence. In response, the register read/write unit 1820 clears all of the entries 1815 in the detach register 1810. Whenever a communication is received from a PEA, the register read/write unit 1820 sets the bit in the corresponding entry 1815.

When the detach timer 1830 reaches the end of the time-out interval, it informs the register read/write unit 1820. At this time, the register read/write unit 1820 examines the entries 1815 of the detach register 1810 to determine which PEAs have communicated with the Hub during the time-out interval. The register read/write unit 1820 informs the detach unit 1840 which PEAs have not communicated with the Hub during the time-out interval. The detach unit 1840, in turn, commences to detach these PEAs.

The PEAs contain detach logic similar to the detach logic 1800 shown in FIG. 18. The detach register of the PEAs, however, contains only a single bit. If a PEA operating in the connection-based attachment mode wants to force its own detachment sooner than the time-out interval provided by the Hub, the PEA sets its Detach Interval to a value less than or equal to the value provided by the Hub. When the Detach Interval expires, the PEA detaches from the network.

The Hub prevents accidental reassignment of a MAC address to a second PEA by preventing reassignment of the address for at least one time-out interval after the last status request token is sent to the MAC address. This forces the PEA to acknowledge loss of its connection to the Hub, and thus, effect detachment.

CONCLUSION

Systems and methods consistent with the principles of the present invention provide a wireless personal area network that permits a host device to communicate with peripheral devices with minimal power and minimal interference from neighboring networks by using a customized TDMA protocol. The network supports dynamic attachment mechanisms by which the peripheral devices can join the network, and detachment mechanisms by which the host and peripheral devices can force peripheral devices detach from the network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the send and receive FIFOs may include Full and Empty flags to coordinate access to the FIFOs by multiple parts of the DCL. The DCL would use the Full and Empty flags in its accesses to the FIFOs, so as not to write to a full FIFO or read from an empty FIFO.

What is claimed is:

1. A network comprising:

a plurality of peripheral devices;

a hub device communicating with the peripheral devices; and at least one attaching peripheral device requesting to communicate with the hub device, the hub device receiving the communication request from the attaching peripheral device, providing the attaching peripheral device with approval and a time-out interval, and detaching the attaching peripheral device when the attaching peripheral device fails to communicate with the hub device for a period of time equal to the time-out interval.

2. The network of claim 1, wherein the hub device includes:

a register with an entry for each of the peripheral devices, each of the entries storing an indication of whether the corresponding peripheral device has communicated with the hub device.

3. The network of claim 2, wherein the hub device further includes:

a timer that counts a period of time equal to the time-out interval and outputs signals indicative of a start and finish of the counting, and a read/write unit, connected to the timer and the register, that receives the start signal from the timer and resets the entries in the register, that sets the entries in the register when the hub device receives communication from the corresponding peripheral devices, and that receives the finish signal from the timer and determines which of the peripheral devices has failed to communicate with the hub device during the time-out interval by reference to the entries in the register.

4. The network of claim 3, wherein the hub device further includes:

a detach unit that detaches from the network the peripheral devices that have failed to communicate with the hub device during the time-out interval.

5. The network of claim 1, wherein the hub device includes:

hub digital control logic that determines whether to permit the attaching peripheral device to communicate with the hub device in response to the communication request, selects an address for the attaching peripheral device, and transmits a message to the attaching peripheral device including the selected address, an indication of whether the attaching peripheral device is permitted to communicate with the hub device, and the time-out interval.

6. The network of claim 5, wherein the attaching peripheral device includes:

peripheral digital control logic that receives the message from the hub device, records the selected address, and sets a detach interval corresponding to the time-out interval.

7. The network of claim 6, wherein the peripheral digital control logic includes:

means for setting the detach interval to a value less than the time-out interval.

8. The network of claim 1, wherein the attaching peripheral device includes:

means for negotiating with the hub device to determine the time-out interval.

9. The network of claim 1, wherein the time-out interval is an indefinite period.

10. In a personal area network having a plurality of peripheral devices attached to the network, at least one attaching peripheral device unattached from the network, and a hub device connected to the network, a method for attaching and detaching the attaching peripheral device comprising:

transmitting, by the attaching peripheral device, a request to attach to the network;

receiving the attachment request at the hub device;

selecting an address for the attaching peripheral device;

providing the attaching peripheral device with attachment approval, the selected address, and a time-out interval;

failing to receive communication at the hub device from the attaching peripheral device for a period of time equal to the time-out interval; and detaching the attaching peripheral device in response to the failure to receive communication from the attaching peripheral device for the time period.

11. The method of claim 10, wherein the step of failing to receive communication includes the substep of:

storing, in a register in the hub device, an entry for each of the attached peripheral devices indicating whether the corresponding attached peripheral device has communicated with the hub device.

12. The method of claim 11, wherein the step of failing to receive communication further includes the substeps of:

counting the time period, outputting signals indicative of a start and finish of the counting, resetting the entries in the register in response to the start signal, setting the entries in the register when the hub device receives communication from the corresponding attached peripheral devices, and determining, in response to the finish signal, which of the attached peripheral devices has failed to communicate with the hub device during the time-out interval by reference to the entries in the register.

13. The method of claim 10, wherein the step of providing the attaching peripheral device with attachment approval includes the substeps of:

determining, at the hub device, whether to permit the attaching peripheral device to attach to the network in response to the attachment request, and transmitting a message to the attaching peripheral device including the selected address, an indication of whether the attaching peripheral device is permitted to attach to the network, and the time-out interval.

14. The method of claim 13, further comprising the steps of:

receiving, at the attaching peripheral device, the message from the hub device, recording the selected address in the attaching peripheral device, and setting a detach interval in the attaching peripheral device corresponding to the time-out interval.

15. The method of claim 14, wherein the step of setting a detach interval includes the substep of:

setting the detach interval to a value less than the time-out interval.

16. The method of claim 10, wherein the step of providing the attaching peripheral device with attachment approval includes the substep of:

negotiating between the hub device and the attaching peripheral device to determine the time-out interval.

17. In a network having a plurality of peripheral devices connected to a hub device, the hub device comprising:

a register with an entry for each of the peripheral devices, each of the entries storing an indication of whether the corresponding peripheral device has communicated with the hub device;

a timer that counts a period of time equal to a time-out interval and outputs signals indicative of a start and finish of the counting;

a read/write unit, connected to the timer and the register, that receives the start signal from the timer and resets the entries in the register, that sets the entries in the register when the hub device receives communication from the corresponding peripheral devices, and that receives the finish signal from the timer and determines which of the peripheral devices has failed to communicate with the hub device during the time-out interval by reference to the entries in the register; and a detach unit that detaches from the network the peripheral devices that have failed to communicate with the hub device during the time-out interval.

18. The hub device of claim 17, further comprising:

means for receiving a request from an attaching peripheral device to connect to the network; and means for providing the attaching peripheral device with attachment approval and the time-out interval.

19. The hub device of claim 18, wherein the means for providing the attaching peripheral device with attachment approval includes:

means for determining whether to permit the attaching peripheral device to connect to the network in response to the attachment request, means for selecting an address for the attaching peripheral device, and means for transmitting a message to the attaching peripheral device including the selected address, an indication of whether the attaching peripheral device is permitted to connect to the network, and the time-out interval.

20. The hub device of claim 18, wherein the means for providing the attaching peripheral device with attachment approval includes:

means for negotiating with the attaching peripheral device to determine the time-out interval.

21. In a network having a plurality of peripheral devices and a hub device, each of the peripheral devices comprising:

a register having a single entry that stores an indication of whether the peripheral device has communicated with the hub device;

a timer that counts a period of time equal to a detach interval and outputs signals indicative of a start and finish of the counting;

a read/write unit, connected to the timer and the register, that receives the start signal from the timer and resets the register entry, that sets the register entry when the peripheral device communicates with the hub device, and that receives the finish signal from the timer and determines whether the peripheral device failed to communicate with the hub device during the detach interval by reference to the register entry; and a detach unit that prepares the peripheral device for detaching from the network when the peripheral device fails to communicate with the hub device during the detach interval.

22. The peripheral device of claim 21, further comprising:

means for transmitting to the hub device a request to attach to the network.

23. The peripheral device of claim 22, further comprising:

means for receiving attachment approval and a time-out interval from the hub device; and means for setting the detach interval based on the time-out interval.

24. The peripheral device of claim 23, wherein the means for receiving attachment approval includes:

means for negotiating with the hub device to determine the time-out interval.

25. The peripheral device of claim 23, wherein the means for setting the detach interval includes:

means for assigning a value to the detach interval that is less than the time-out interval received from the hub device.

26. A wireless network, comprising:

a plurality of peripheral devices; and a hub device communicating with the peripheral devices, the hub device including means for counting for a predetermined period of time, means for storing data for each of the peripheral devices in response to a start of the counting, means for changing the data for each of the peripheral devices that has communicated with the hub device during the predetermined time period, means for determining which of the peripheral devices failed to communicate with the hub device during the predetermined time period based on the changed data, and means for disconnecting, from the network, the peripheral devices that have failed to communicate with the hub device during the predetermined time period.

27. In a wireless network having a plurality of peripheral devices and a hub device communicating with the peripheral devices, a method, executed by the hub device, comprising the steps of:

counting for a predetermined period of time;

storing first data for each of the peripheral devices in response to a start of the counting;

storing second data for each of the peripheral devices that has communicated with the hub device during the predetermined time period;

determining which of the peripheral devices failed to communicate with the hub device during the predetermined time period based on the second data; and disconnecting, from the network, the peripheral devices that have failed to communicate with the hub device during the predetermined time period.

* * * * *